US011942850B2

(12) United States Patent
Haas et al.

(10) Patent No.: US 11,942,850 B2
(45) Date of Patent: Mar. 26, 2024

(54) ELECTRICAL MACHINE WITH AN INTEGRATED HEAT EXCHANGER

(71) Applicant: Valeo Siemens eAutomotive Germany GmbH, Erlangen (DE)

(72) Inventors: Bernd Haas, Erlangen (DE); Burkhard Pollak, Erlangen (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 65 days.

(21) Appl. No.: 17/456,020

(22) Filed: Nov. 22, 2021

(65) Prior Publication Data

US 2022/0166285 A1    May 26, 2022

(30) Foreign Application Priority Data

Nov. 25, 2020   (DE) ...................... 10 2020 214 829.5

(51) Int. Cl.
*H02K 5/20*    (2006.01)
*H02K 7/00*    (2006.01)
(Continued)

(52) U.S. Cl.
CPC .............. *H02K 5/20* (2013.01); *H02K 7/003* (2013.01); *H02K 7/006* (2013.01); *H02K 7/08* (2013.01); *H02K 7/116* (2013.01)

(58) Field of Classification Search
CPC .......... H02K 5/20; H02K 7/003; H02K 7/006; H02K 7/08; H02K 7/116; H02K 7/083;
(Continued)

(56) References Cited

U.S. PATENT DOCUMENTS

| 2002/0135245 A1* | 9/2002 | Derleth | ................ | H02K 9/227 |
| | | | | 310/64 |
| 2016/0164378 A1* | 6/2016 | Gauthier | ................ | H02K 9/19 |
| | | | | 310/54 |

(Continued)

FOREIGN PATENT DOCUMENTS

| DE | 10131119 A1 * | 1/2003 | ............... H02K 1/20 |
| DE | 102011084033 A1 | 4/2013 | |

(Continued)

OTHER PUBLICATIONS

DE 10131119 A1 (Year: 2003).*

(Continued)

*Primary Examiner* — Jose A Gonzalez Quinones (57) ABSTRACT

The invention specifies an electrical machine (1, 1a . . . 1c) which comprises a housing (8), a stator (5) which is arranged in the housing (8) and a rotor (3) which is rotatably mounted in the housing (8). At least one first coolant duct (9) of a first cooling circuit (15) and at least one second coolant duct (10, 10a, 10b) of a second cooling circuit (16) are arranged in the region of the stator (5) in the housing (8). In this case, the coolant ducts (9, 10, 10a, 10b) and the housing (8) form a heat exchanger between the first cooling circuit (15) and the second cooling circuit (16). In addition, the invention specifies a gear motor comprising the electrical machine (1, 1a . . . 1c), in which gear motor the transmission is hydraulically connected to the at least one second coolant duct (10, 10a, 10b) of the second cooling circuit (16). The invention also specifies a vehicle (27) which is driven by the said electrical machine (1, 1a . . . 1c) or by the said gear motor.

8 Claims, 5 Drawing Sheets

(51) Int. Cl.
*H02K 7/08* (2006.01)
*H02K 7/116* (2006.01)

(58) Field of Classification Search
CPC ............ H02K 9/18; H02K 9/19; H02K 5/203; H02K 1/20; H02K 5/207
USPC ......................................... 310/52, 54, 58, 59
See application file for complete search history.

(56) References Cited

U.S. PATENT DOCUMENTS

2018/0334924 A1* 11/2018 Bogiatzidis .............. H02K 9/24
2020/0106341 A1* 4/2020 Endo ...................... H02K 7/006

FOREIGN PATENT DOCUMENTS

| DE | 102016110658 | A1 | * | 12/2017 | ............... H02K 5/20 |
| DE | 102016110658 | A1 | | 12/2017 | |
| DE | 102018121203 | A1 | * | 3/2020 | ............... H02K 5/20 |
| DE | 102018121203 | A1 | | 3/2020 | |
| EP | 2020735 | A2 | | 2/2009 | |
| EP | 3028888 | A1 | | 6/2016 | |
| SU | 951566 | A1 | | 8/1982 | |

OTHER PUBLICATIONS

DE 102018121203 A1 (Year: 2020).*
DE 102016110658 A1 (Year: 2017).*
European Office Action in corresponding European Application No. 21 208 334.9, dated May 10, 2022 (7 pages).

* cited by examiner

ELECTRICAL MACHINE WITH AN INTEGRATED HEAT EXCHANGER

TECHNICAL FIELD

The invention relates to an electrical machine, to a gear motor comprising a transmission and an electrical machine which is coupled to the transmission, and also to a vehicle which is driven by the said electrical machine or by the said gear motor.

PRIOR ART

Electrical machines are in many cases part of complex technical installations or arrangements which often have to be cooled at least in parts in order to be able to dissipate the waste heat which is produced in the various devices of the technical installations or arrangements. Cooling circuits, in which a liquid or else gaseous heat carrier is used for transporting away the waste heat, provide a possible solution for this. For example, the electrical machine may have at least one first coolant duct of a first cooling circuit, through which a heat carrier flows, for this purpose. For example, a pump which is arranged in the first cooling circuit may transport the heat which is produced in the electrical machine to a heat exchanger, at which the heat is released to the surrounding area, by means of the heat carrier. The heat carrier may be, for example, a cooling liquid and the heat exchanger may be a water/air heat exchanger. Not only can the electrical machine have such a circuit, but rather the other devices contained in technical installations or arrangements can likewise also have such a heat exchanger. This leads, under certain circumstances, to a plurality of cooling circuits with a plurality of heat exchangers having to be installed in the technical installations or arrangements. Particularly when the installation space provided is limited, appropriate arrangement of heat exchangers may become problematical. For example, radiators are usually installed at the front of vehicles, where the installation space is naturally very limited.

DISCLOSURE OF THE INVENTION

It is therefore an object of the invention to provide an improved electrical machine, an improved gear motor and also an improved vehicle comprising such an electrical machine or such a gear motor. In particular, a possible way of cooling devices in technical installations or arrangements given only a small amount of available installation space is intended to be specified.

The object of the invention is achieved by an electrical machine which comprises a housing, a stator which is arranged in the housing and is fixedly connected to it and a rotor which is arranged in the housing, is arranged on a rotor shaft and is mounted rotatably about the axis of rotation of the rotor and the rotor shaft in relation to the stator. At least one first coolant duct of a first cooling circuit is arranged in the region of the stator in the housing. In addition, at least one second coolant duct of a second cooling circuit is arranged in the housing in the region of the stator, and the two coolant ducts and the housing of the electrical machine form a heat exchanger between the first cooling circuit and the second cooling circuit. The at least one first coolant duct and the at least one second coolant duct are therefore not hydraulically connected to one another, that is are hydraulically separated from one another.

The object of the invention is further achieved by a gear motor which comprises a transmission and an electrical machine which is coupled to the transmission, wherein the transmission is hydraulically connected to the at least one second coolant duct of the second cooling circuit.

Finally, the object is also achieved by a vehicle with at least two axles, of which at least one is driven, wherein the said driving is performed at least partially or for part of the time by the abovementioned electrical machine or the abovementioned gear motor.

By means of the proposed measures, the electrical machine itself can function as a heat exchanger. The electrical machine as such is formed in a manner known per se by means of the first cooling circuit. However, other devices to be cooled can also be connected to the electrical machine. In this case, heat which is produced in the external device to be cooled is transported via the heat exchanger in the second cooling system to the electrical machine and transferred there to the first cooling system. From there, the heat is transported to a heat exchanger or radiator in the above-described manner and released there to the surrounding area. Therefore, the external device to be cooled can likewise be cooled without a separate heat exchanger being required for this purpose. In this way, the small amount of available installation space can be utilized in an optimum manner.

For example, the at least one first coolant duct can be encapsulated in the housing of the electrical machine, and the at least one second coolant duct can be formed by a pipe which is arranged in or next to the at least one first coolant duct. In this way, in particular, pre-existing first coolant ducts can be used for the at least one second coolant duct, as a result of which pre-existing electrical machines can be correspondingly upgraded or pre-existing housings or housing forms can be used for constructing further electrical machines.

However, it is also conceivable for the at least one first and the at least one second coolant duct to be encapsulated in the housing of the electrical machine. In this way, the arrangement of a pipe in the first coolant duct can be dispensed with, as a result of which assembly of the electrical machine is simplified.

In particular, the electrical machine can have a seal nipple which is hydraulically connected to the at least one second coolant duct and is designed for the connection of a hose or pipe. In this way, the electrical machine can be integrated into the second cooling circuit in a simple manner.

In particular, the at least one first coolant duct and the at least one second coolant duct can run in a helical manner. Therefore, in principle, a single first coolant duct and a single second coolant duct can extend over the length of the electrical machine. However, the at least one first coolant duct and the at least one second coolant duct can also run in a different direction. In particular, they can run—at least in sections—in the axial direction or along circles around the rotor axis. For example, a plurality of first coolant ducts can also start from a first collector and open into a second collector. Similarly, a plurality of second coolant ducts can also start from a first collector and open into a second collector.

It should be noted at this point that the electrical machine and, respectively, the further external device can not only be cooled using the proposed measures but can, of course, also be heated. For example, the drive motor and a transmission of a vehicle can be preheated using the proposed measures in the case of low outside temperatures. In this case, heat is transported in the opposite direction to that for cooling. A heater may possibly be provided in the first or in the second cooling circuit for this purpose. Therefore, the terms "cool" and "heat" are interchangeable within the scope of the disclosure.

Further advantageous refinements and developments of the invention can be found in the dependent claims and in the description considered in conjunction with the figures.

It is advantageous when two second coolant ducts are provided for each first coolant duct and belong to different cooling circuits or form sections of a single second cooling circuit through which fluid flows in opposite directions. If the second coolant ducts belong to different cooling systems, the number of second cooling systems can be doubled, as a result of which a further device to be cooled can be cooled. This procedure is advantageous particularly when different heat carriers are used or have to be used in the two cooling systems and the devices to be cooled cannot be integrated into a second cooling system. If the second coolant ducts form sections of a single second cooling system through which fluid flows in opposite directions, the heat-releasing area in the second cooling system, for example, can then be doubled as a result and the cooling capacity can therefore likewise be almost doubled. For example, the two second coolant ducts are connected to one another at one end for this purpose.

It is further advantageous when the rotor shaft is of hollow design and is hydraulically connected to the at least one second coolant duct of the second cooling circuit In this way, the rotor of the electrical machine can be cooled by the heat carrier in the second cooling system. In particular, the rotor shaft can also have cooling bores, so that the heat carrier can extend from the rotor shaft into the interior of the electrical machine. In a gear motor, it is in particular also advantageous when the rotor shaft is of hollow design and is hydraulically connected to the transmission via a bearing which is arranged on the rotor shaft, and the rotor shaft and the bearing are part of the second cooling circuit. In this way, the transmission can be cooled by means of the heat carrier in the second cooling system.

The above refinements and developments of the invention may be combined in an arbitrary fashion.

BRIEF DESCRIPTION OF THE FIGURES

Exemplary embodiments of the invention are illustrated in an exemplary manner in the appended schematic figures, in which.

DETAILED DESCRIPTION OF THE INVENTION

Initially, it is stated that identical parts in the different embodiments are provided with the same reference signs or the same component designations, in some cases with different indices. The disclosures of a component contained in the description may accordingly be transferred to another component with the same reference sign or the same component designation. Also, the positional data selected in the description, such as for example "top", "bottom", "rear", "front", "side" etc. relates to the figure directly described and illustrated, and in the event of a change in position, should be transferred accordingly to the new position.

Figure 1:
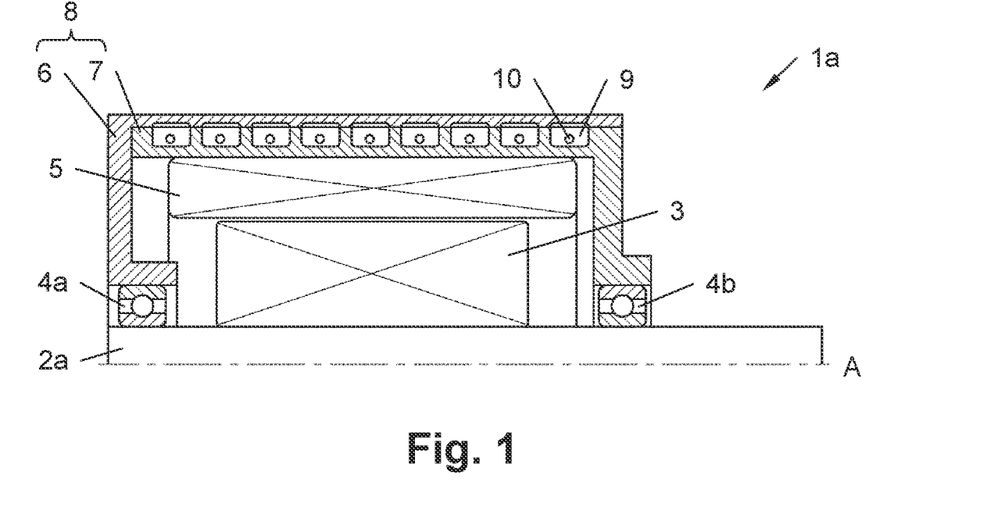
FIG. 1 shows a schematic half-sectional view of an exemplary electrical machine with a second coolant duct which runs in the first coolant duct.

FIG. 1 shows a half-section through a schematically illustrated electrical machine 1a. The electrical machine 1a comprises a shaft 2a with a rotor 3 seated on it, wherein the shaft 2a is mounted rotatably about an axis of rotation A in relation to a stator 5 by means of (rolling) bearings 4a, 4b. The rotor 3 has, in particular, rotor laminations, not illustrated in detail, which are arranged one behind the other and also rotor magnets or a rotor winding. The stator 5 has, in particular, stator laminations, not illustrated in detail, which are arranged one behind the other and also a stator winding.

In the example shown in FIG. 1, the first bearing 4a is seated in a first housing part 6 and the second bearing 4b is seated in a second housing part 7. The second housing part 7 is situated radially on the inside and the first housing part 6 is situated radially on the outside in the region of the stator 5. In this example, the second housing part 7 receives the stator 5 which is fixedly (that is to say rotationally rigidly) connected to the second housing part 7. The two housing parts 6, 7 are enclosed by the housing 8 of the electrical machine 1 and form, in the region of the stator 5, a first coolant duct 9 which—as is assumed in the example shown FIG. 1—can run, in particular, along a helical line around the stator 5. Therefore, FIG. 1 shows the single first coolant duct 9, sectioned at several points, which is part of a first cooling system, not illustrated in any detail in FIG. 1.

Furthermore, a second coolant duct 10 of a second cooling system is arranged in the region of the stator 5 in the housing 8, the said second cooling system likewise not being illustrated in any detail in FIG. 1. The two coolant ducts 9, 10 and the housing 8 of the electrical machine 1, in particular that part of the housing 8 in the region of the stator 5, form a heat exchanger between the first and the second cooling system as a result.

In this example, the first coolant duct 9 is encapsulated in the housing 8 of the electrical machine 1 and the second coolant duct 10 is formed by a pipe which is arranged in the first coolant duct 9. Therefore, the second coolant duct 10 likewise runs along a helical line around the stator 5 in the example shown. As an alternative, it would be conceivable for the second coolant duct 10 to likewise be encapsulated in the housing 8 of the electrical machine 1 (compare FIG. 7).

Figure 2:
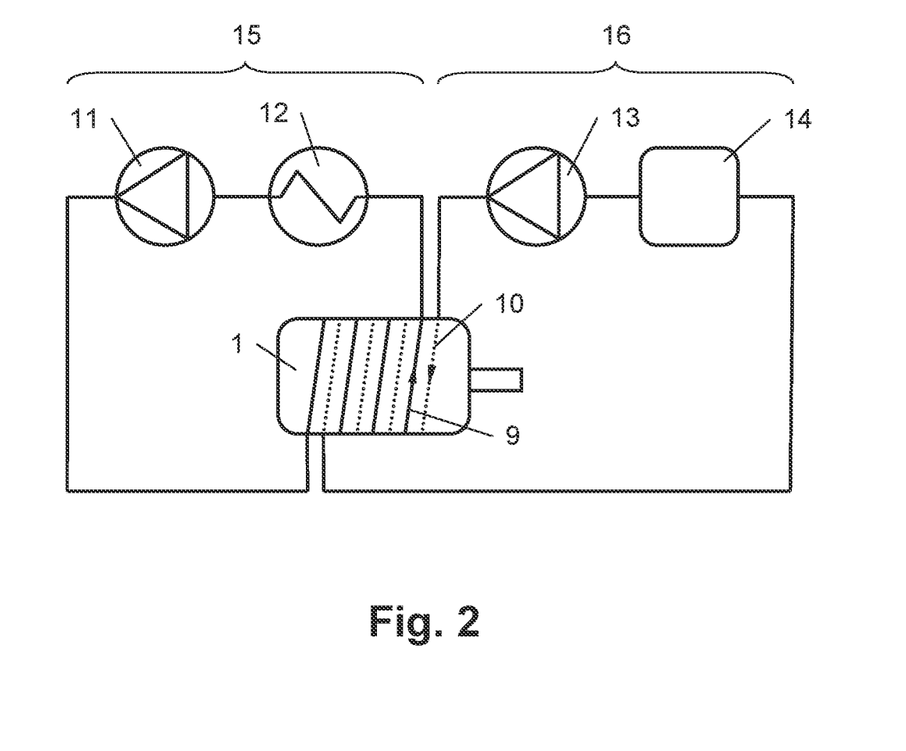
FIG. 2 shows a schematic example of the use of the heat exchanger which is integrated in the electrical machine.

FIG. 2 now shows a schematic illustration of how the heat exchanger which is formed by the two coolant ducts 9, 10 can be used. A first pump 11 and an external heat exchanger 12 are connected to the first coolant duct 9. A second pump 13 and an external device 14 to be cooled are connected to the second coolant duct 10. The first coolant duct 9, the first pump 11 and the external heat exchanger 12 are part of the first cooling circuit or cooling system 15 and the second coolant duct 10, the second pump 13 and the external device 14 to be cooled are part of the second cooling circuit or cooling system 16.

Figure 13:
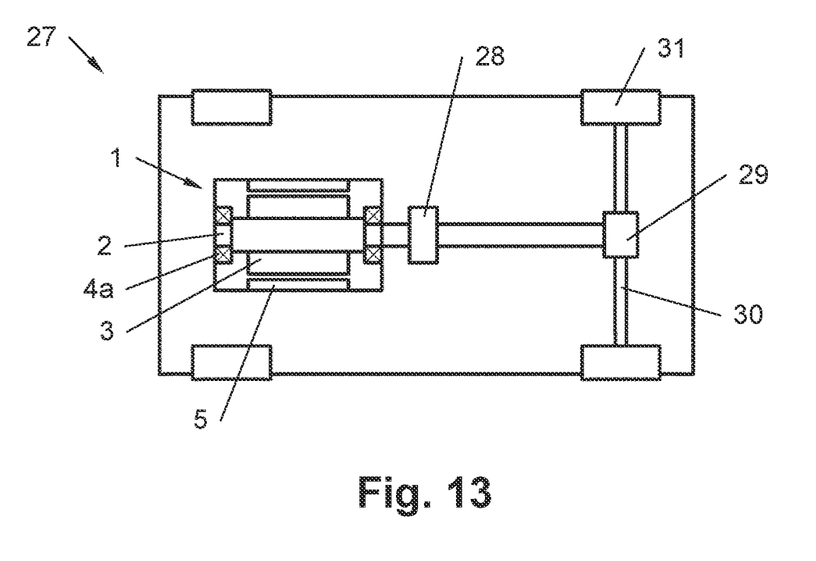
FIG. 13 shows an electrical machine with coolant ducts of the proposed type, which is installed in a vehicle.

For example, the arrangement illustrated in FIG. 2 can be installed in a vehicle, wherein the electrical machine 1 can form, in particular, a drive motor for the vehicle (also compare FIG. 13). For example, the external heat exchanger 12 can be arranged on the front side of the vehicle and can be cooled by the ambient air or the airflow. It goes without saying that a blower or a fan for assisting the cooling effect, in particular for assisting the cooling effect when the vehicle is stationary, can also be arranged in the region of the external heat exchanger 12. For example, water or water admixed with antifreeze can act as a heat carrier in the first cooling system 15. The electrical machine 1 is cooled by means of the cooling water which flows through the first coolant duct 9. For this purpose, the heat which is generated in the electrical machine 1 is transported by way of the first pump 11, via the cooling water, to the external heat exchanger 12 and released there to the ambient air.

However, the housing 8 of the electrical machine 1 at the same time also forms a heat exchanger between the first cooling system 15 and the second cooling system 16. If the second pump 13 is in operation, heat which is produced in the external device 14 to be cooled is transported via the heat carrier in the second cooling system 16 to the electrical machine 1 and transferred there to the first cooling system 15. From there, the heat is transported to the external heat exchanger 12 in the above-described manner and released there to the ambient air. Therefore, the external device 14 to be cooled can likewise be cooled without a separate heat exchanger being required for this purpose.

Figure 4:
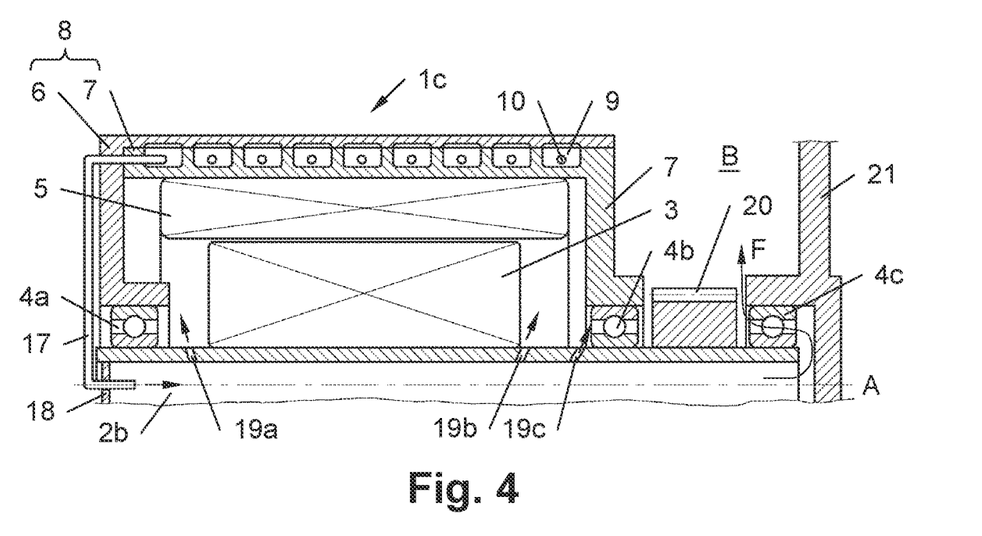
FIG. 4 is similar to FIG. 1, but with a transmission which is flange-connected to the electrical machine.

The external device 14 to be cooled may be, in particular, a transmission, and the heat carrier in the second cooling system 16 may be, in particular, transmission oil (also see FIG. 4).

It goes without saying that the basic manner of operation of the heat exchanger contained in the electrical machine 1 is not linked to the embodiment described above in connection with FIG. 2, but rather is to be regarded as being purely illustrative. The arrangement shown can also be arranged at a location other than in a vehicle, and the external device 14 to be cooled does not have to be a transmission. The heat carriers proposed for the first cooling system 15 and the second cooling system 16 are also to be regarded as being purely exemplary, and other liquid or else gaseous heat carriers can also be used. A phase change between a liquid and a gaseous state of aggregation can also take place in gaseous heat carriers. In particular, a compressor can also be provided in the cooling system in question.

Furthermore, it should be noted that the coolant ducts 9, 10 do not necessarily have to run along a helical line, but rather can also run in a different way. In particular, a plurality of first coolant ducts 9 through which fluid flows in parallel and/or a plurality of second coolant ducts 10 through which fluid flows in parallel can also be provided. For example, a plurality of first coolant ducts 9 can start from a first collector and open into a second collector. In particular, the first coolant ducts 9 can then run in the axial direction or along circles around the axis of rotation A. The statements made in respect of the first coolant ducts 9 accordingly apply to the second coolant ducts 10.

Finally, it should also be noted that fluid also advantageously flows in opposite directions through the coolant ducts 9, 10—as is illustrated in FIG. 2—and then form a countercurrent heat exchanger with the housing 8. However, fluid can, in principle, also flow through the coolant ducts 9, 10 in the same direction and then form a cocurrent heat exchanger with the housing 8.

Figure 3:
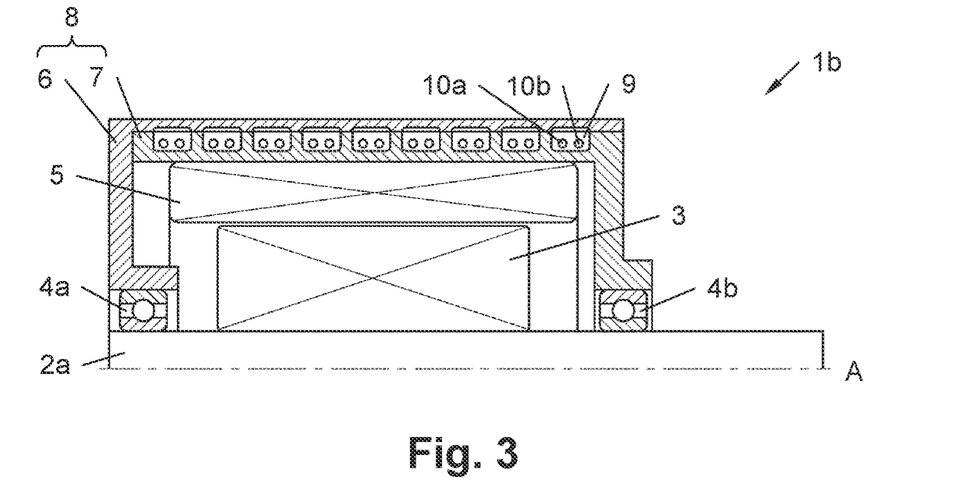
FIG. 3 shows a schematic half-sectional view of an exemplary electrical machine with two second coolant ducts which run in the first coolant duct.

FIG. 3 now shows a further example of an electrical machine 1b which is very similar to the electrical machine 1a illustrated in FIG. 1. In contrast thereto, two second coolant ducts 10a, 10b are provided for each first coolant duct 9 in the electrical machine 1b. Specifically, the second coolant ducts 10a, 10b are provided as pipes in the example shown. However, it would in turn be conceivable for the second coolant ducts 10a, 10b to be encapsulated in the housing 8.

[001] The second coolant ducts 10a, 10b can belong to different cooling systems or form sections of a single second cooling system 16 through which fluid flows in opposite directions. If the second coolant ducts 10a, 10b belong to different cooling systems, the second cooling systems 16 can be doubled in FIG. 2, as a result of which a further device to be cooled can be cooled. This is advantageous in particular when different heat carriers are used or have to be used in the two cooling systems and the further device to be cooled cannot be inserted into the second cooling system 16.

If the second coolant ducts 10a, 10b form sections of a single second cooling system 16 through which fluid flows in opposite directions, the heat-releasing area in the second cooling system 16, for example, can then be doubled as a result and the cooling capacity can therefore likewise be almost doubled. For example, the two second coolant ducts 10a, 10b are connected at one end for this purpose (also see FIG. 12).

FIG. 4 shows a further example of an electrical machine 1c which is, in turn, similar to the electrical machine 1a illustrated in FIG. 1. In contrast thereto, the rotor shaft 2b is of hollow design and is hydraulically connected to the second coolant duct 10 of the second cooling system 16. For this purpose, the second coolant duct 10 is connected to the pipe 17 which is guided into the region of the rotor shaft 2b and there through a sealing disc 18 into the interior of the rotor shaft 2b. It goes without saying that the pipe which forms the second coolant duct 10 can also be directly guided into the region of the rotor shaft 2b and there through a sealing disc 18 into the interior of the rotor shaft 2b. Therefore, the heat carrier also flows through the rotor shaft 2b in the second cooling system 16. From there, the said heat carrier can also enter the interior of the electrical machine 1 via cooling/lubricating bores 19a . . . 19c and cool the rotor 3 and the bearings 4a, 4b and—provided that the second heat carrier is oil—also lubricate the bearings 4a, 4b.

In the example shown in FIG. 4, a transmission is further coupled to the electrical machine 1. The arrangement shown in FIG. 4 is therefore part of a gear motor. Specifically, a pinion 20 is seated directly on the rotor shaft 2b and drives a further gear, not illustrated, of the transmission. In this case, the pinion 20 runs in the interior of a transmission housing 21, that is to say in the transmission interior B of the transmission housing 21.

In the example shown, the transmission is hydraulically connected to the second coolant duct 10 of the second cooling system 16. Specifically, this is done by means of a bearing 4c which is arranged on the rotor shaft 2b. In this case, the direction of flow F indicates the course of the heat carrier through the rotor shaft 2b and through the bearing 4c into the transmission interior B. The rotor shaft 2b, the bearing 4c and the transmission interior B are therefore part of the second cooling system 16 in this example.

It should be noted at this point that the function described in FIG. 4 is not precisely linked to the arrangement illustrated there, but rather parts can also be designed differently. For example, the transmission can have a separate (hollow) transmission shaft which is connected to the rotor shaft 2b. In addition, flow of fluid through the bearing 2c is not absolutely necessary, but rather the hydraulic connection between the rotor shaft 2b and the transmission can also be made via a separate line. In addition to this, yet other variations are also conceivable.

Figure 5:
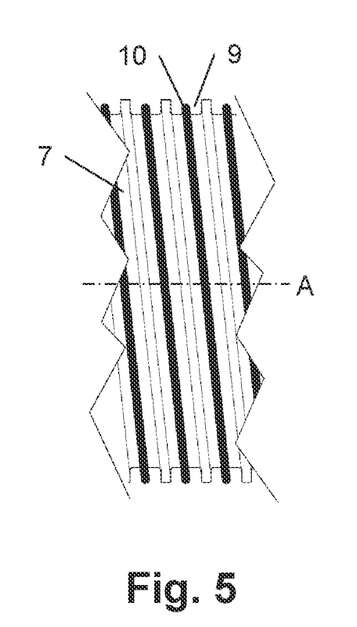
FIG. 5 shows a side view of the coolant ducts of the electrical machine according to FIG. 1.

FIG. 5 now additionally shows a schematic illustration of the coolant ducts 9, 10 of the electrical machine 1a from FIG. 1, wherein the (inner) second housing part 7 is illustrated in side view in isolation from the (outer) first housing part 6. That is to say, the (outer) first housing part 6 is omitted from FIG. 5.

Figure 6:
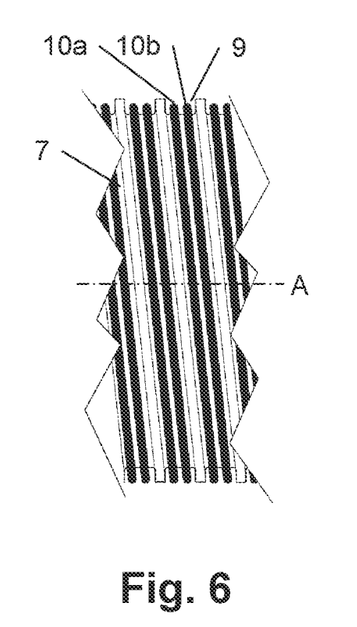
FIG. 6 shows a side view of the coolant ducts of the electrical machine according to FIG. 3.

FIG. 6 is similar to FIG. 5, but shows a schematic illustration of the coolant ducts 9, 10 of the electrical machine 1a from FIG. 3.

Figure 7:
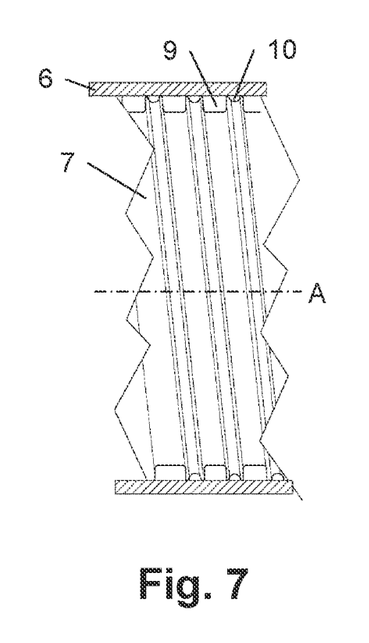
FIG. 7 shows a side view of a first and a second coolant duct which are encapsulated in the housing.

FIG. 7 is similar to FIG. 5, but shows a schematic illustration of coolant ducts 9, 10 which are both encapsulated in the housing 8 of the electrical machine 1. Furthermore, the second coolant duct 10 is not arranged in the, but rather next to the, first coolant duct 9 in this example. In a departure from the illustration in FIG. 5, the (outer) first housing part 6 is illustrated in section here.

Figure 8:
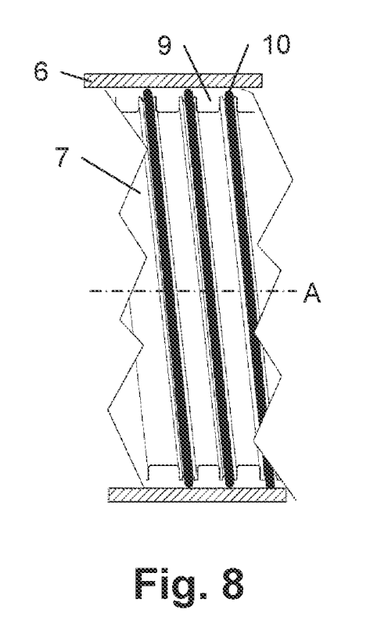
FIG. 8 shows a side view of a second coolant duct which is arranged in a channel in the housing.

FIG. 8 is, in turn, similar to FIG. 7, but the second coolant duct 10 is formed by a separate pipe which is arranged in a channel in the second housing part 7.

Figure 9:
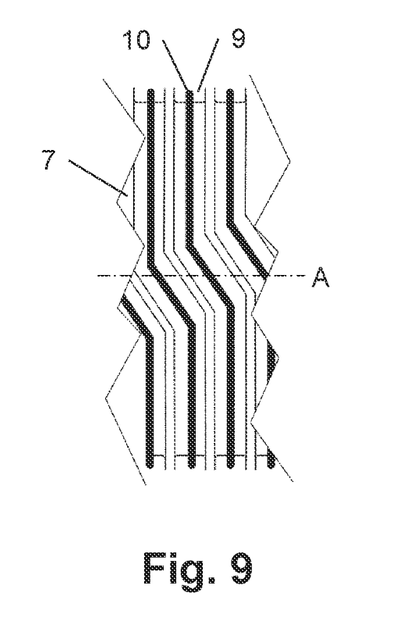
FIG. 9 is similar to FIG. 5, but with coolant ducts which run in the circumferential direction at least in sections.

FIG. 9 is again similar to FIG. 5. However, in contrast thereto, the coolant ducts 9, 10 do not run along a helical line with a constant pitch, but rather the coolant ducts 9, 10 run in a wide peripheral region along circles around the axis of rotation A. The course of the coolant ducts 9, 10 has an axial component only in a narrow peripheral region.

Figure 10:
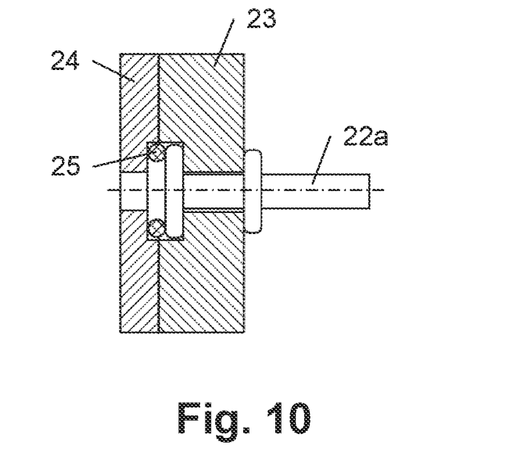
FIG. 10 shows a first example of a seal nipple.

FIG. 10 now shows a first example of a seal nipple 22a which is installed in a first plate 23 and which is sealed off from a second plate 24 by means of a sealing ring 25. The seal nipple 22a can be hydraulically connected, in particular, to the second coolant duct 10 and can be designed for connection of a hose or pipe which is likewise part of the second cooling system 16. The first plate 23 and the second plate 24 can be part of the first housing part 6 and the second housing part 7.

Figure 11:
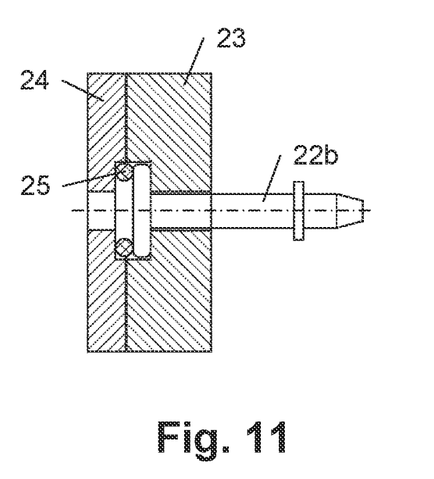
FIG. 11 shows a second example of a seal nipple.

FIG. 11 shows a second example of a seal nipple 22b which is, in turn, installed in a first plate 23 and which is sealed off from a second plate 24 by means of a sealing ring 25. The seal nipple 22b can again be hydraulically connected to the second coolant duct 10 and can be designed for connection of a hose or pipe which is likewise part of the second cooling system 16.

Figure 12:
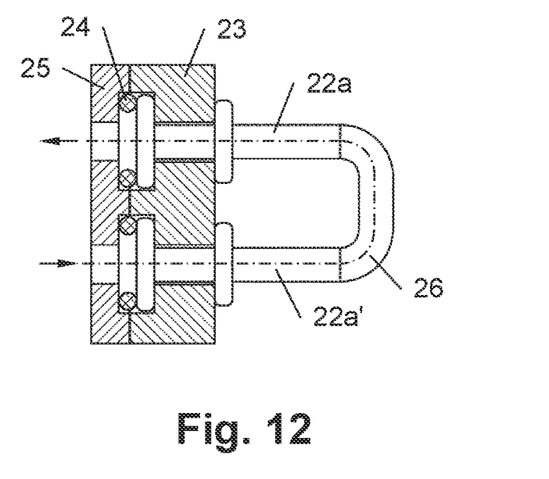
FIG. 12 shows two seal nipples which are connected to a pipe bridge.

FIG. 12 shows an example of a hose or pipe connection which is very similar to the example of a hose or pipe connection shown in FIG. 10. However, in contrast thereto, two seal nipples 22a, 22a' are provided. For example, the seal nipple 22a can be hydraulically connected to the second coolant duct 10a and the seal nipple 22a' can be hydraulically connected to the second coolant duct 10b of the electrical machine 1b illustrated in FIG. 3. The two seal nipples 22a, 22a' can therefore in turn be part of two different cooling systems, or—as is the case in FIG. 12—belong to one and the same cooling system 16. For this purpose, the two seal nipples 22a, 22a' are connected to a connecting pipe or a pipe bridge 26 or a hose. As a result, fluid flows through the second coolant ducts 10a, 10b in opposite directions. The electrical machine 1b can be readily adapted for different purposes using the proposed measures and can be used without connection of the two seal nipples 22a, 22a' for different cooling systems 16 and with connection of the two seal nipples 22a, 22a' for one and the same cooling system 16.

FIG. 13 finally shows the electrical machine 1 which is installed in a vehicle 27. The vehicle 27 has at least two axles, at least one of which is driven. Specifically, the electric motor 1 is connected to an optional transmission 28 and a differential gear 29. The half-shafts 30 of the rear axle adjoin the differential gear 29. Finally, the driven wheels 31 are mounted on the half-shafts 30. Driving of the vehicle 27 is performed at least partially or for part of the time by the electrical machine 1. This means that the electrical machine 1 may serve for solely driving the vehicle 27, or for example may be provided in conjunction with an internal combustion engine (hybrid drive).

In particular, the transmission 28 and/or the differential gear 29 can form the device 14 to be cooled in FIG. 2 and therefore can be part of the second cooling circuit 16. The transmission 28 can be, in particular, directly flange-connected to the electrical machine 1 and the differential gear 29 can also be integrated into the transmission 28. In particular, the electrical machine 1, the transmission 28 and differential gear 29 can form a physical unit.

It should also be noted at this point that the electrical machine 1 and, respectively, the further external device 14 can not only be cooled using the proposed measures but can, of course, also be heated. For example, the electrical machine 1 and the transmission 28 can be preheated in the case of low outside temperatures. In this case, heat is transported in the opposite direction to that for cooling. A heater may possibly be provided in the first cooing circuit 15 and/or in the second cooling circuit 16 for this purpose.

Finally, it is established that the scope of protection is determined by the patent claims. The description and the drawings should however be used to interpret the claims. The features contained in the figures may be interchanged and combined with one another in an arbitrary fashion. In particular, it is also established that the devices illustrated may in reality also comprise more or else fewer component parts than illustrated. In some cases, the illustrated devices or their component parts may also not be illustrated to scale and/or may be increased in size and/or reduced in size.

The invention claimed is:

1. An electrical machine, comprising:
a housing;
a stator which is arranged in and fixedly connected to the housing; and
a rotor which is arranged in the housing, is arranged on a rotor shaft and is mounted rotatably about the axis of rotation of the rotor and the rotor shaft in relation to the stator,
wherein the housing has at least one first coolant duct of a first cooling circuit in the region of the stator,
wherein at least one second coolant duct of a second cooling circuit is arranged in the region of the stator in the housing, and the housing of the electrical machine forms a heat exchanger between the first cooling circuit and the second cooling circuit, and
wherein the at least one first coolant duct, inside which coolant fluid flows separately from the at least one second coolant duct, is encapsulated in the housing of the electrical machine and the at least one second coolant duct, inside which the coolant fluid flows separately and in an opposite direction from the at least one first coolant duct, is formed by a pipe which is encapsulated inside the at least one first coolant duct.

2. The electrical machine according to claim 1, wherein the electrical machine has a seal nipple which is hydraulically connected to the at least one second coolant duct and is for the connection of a hose or pipe.

3. The electrical machine according to claim 1, wherein the at least one first coolant duct and the at least one second coolant duct run in a helical manner.

4. The electrical machine according to claim 1, wherein two second coolant ducts are provided for each first coolant duct wherein the two second coolant ducts each belong to different cooling circuits or form sections of a single second cooling circuit through which fluid flows in opposite directions.

5. The electrical machine according to claim 1, wherein the rotor shaft is of hollow design and is hydraulically connected to the at least one second coolant duct of the second cooling circuit.

6. A gear motor, comprising:
a transmission; and
the electrical machine according to claim 1, which is coupled to the transmission,
wherein the transmission is hydraulically connected to the at least one second coolant duct of the second cooling circuit.

7. The gear motor according to claim 6, wherein the rotor shaft is of hollow design and is hydraulically connected to the transmission via a bearing which is arranged on the rotor shaft, and the rotor shaft and the bearing are part of the second cooling circuit.

8. A vehicle with at least one drive axle, wherein driving of the vehicle is performed at least for part of a time by the electrical machine according to claim 1.

* * * * *